US008332759B2

(12) United States Patent
Park

(10) Patent No.: US 8,332,759 B2
(45) Date of Patent: Dec. 11, 2012

(54) APPARATUS AND METHOD FOR CONVERTING THE VISUAL APPEARANCE OF A JAVA APPLICATION PROGRAM IN REAL TIME

(75) Inventor: Sang-jung Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 639 days.

(21) Appl. No.: 11/338,635

(22) Filed: Jan. 25, 2006

(65) Prior Publication Data

US 2006/0168559 A1 Jul. 27, 2006

(30) Foreign Application Priority Data

Jan. 25, 2005 (KR) ........................ 10-2005-0006800

(51) Int. Cl.
*G06F 3/00* (2006.01)
(52) U.S. Cl. ...................................... 715/744
(58) Field of Classification Search .................. 715/744, 715/745, 746, 747, 749
See application file for complete search history.

(56) References Cited

U.S. PATENT DOCUMENTS

| | | | |
|---|---|---|---|
| 5,905,492 A | 5/1999 | Straub et al. | |
| 6,675,230 B1 | 1/2004 | Lewallen | |
| 2003/0025730 A1 | 2/2003 | Brennan | |
| 2003/0200254 A1 | 10/2003 | Wei | |
| 2003/0231204 A1* | 12/2003 | Hanggie et al. | 345/744 |
| 2004/0090454 A1* | 5/2004 | Lo | 345/727 |
| 2004/0098733 A1 | 5/2004 | Bjare et al. | |
| 2004/0163046 A1 | 8/2004 | Chu et al. | |
| 2004/0216054 A1* | 10/2004 | Mathews et al. | 715/765 |

FOREIGN PATENT DOCUMENTS

| | | |
|---|---|---|
| EP | 1394676 A2 | 3/2004 |
| JP | 2002-063110 A | 2/2002 |
| JP | 2002-132431 A | 5/2002 |
| JP | 2002-215401 A | 8/2002 |
| JP | 2004-094656 A | 3/2004 |
| KR | 2002-0000569 A | 1/2002 |
| WO | 0182065 A2 | 11/2001 |

OTHER PUBLICATIONS

Japanese Office Inquiry, dated Dec. 15, 2010, issued in Application No. 2006-10301.
Hiroshi Iwatani, "To My Shame, I Made a Mistake", 83rd lecture on establishment of java.awt interface, C Magazine, Softbank Corporation, vol. 8, No. 10. Oct. 1, 1996, pp. 130-137.
Japanese Office Action issued on Aug. 9, 2011 in the corresponding Japanese Patent Application No. 2006-10301.
Tadashi, K. "Let's create a Mozilla skin with XUL!" SoftwareDesign Co., Ltd. Technical review, Nov. 18, 2000, No. 212, pp. 108-118.
Kondo, D. "Microsoft Plus! for Windows XP audio/games/theme plus", PCfan, Daily Communications, Dec. 15, 2001, vol. 8, No. 32, pp. 32-33.

(Continued)

*Primary Examiner* — Thanh Vu
(74) *Attorney, Agent, or Firm* — Sughrue Mion, PLLC

(57) ABSTRACT

A method and an apparatus for converting the visual appearance) of a program in real time, and more particularly, to a method and an apparatus for converting the visual appearance of a program in real time, by allowing an interface-based program convert a color combination, font, icon and a text position of a component, and an external appearance of the component in real time by adding a new interface to the application programming interface (API) that defines the visual appearance of the program.

16 Claims, 4 Drawing Sheets

OTHER PUBLICATIONS

Senbokenseuke, "13th custom made "button" in hilarious play with Java", JavaWorld Co., Ltd. IDG Communications, Apr. 1, 1999, vol. 3, No. 4, pp. 153-158.

Tomokiyo, S. et., al. "Enjoy world music with Internet radio", Yomiuri zero-fasco Yomiuri PC, special issue of May, Yomiuri newspaper, May 5, 2002, vol. 7, No. 8, p. 76-81.

* cited by examiner

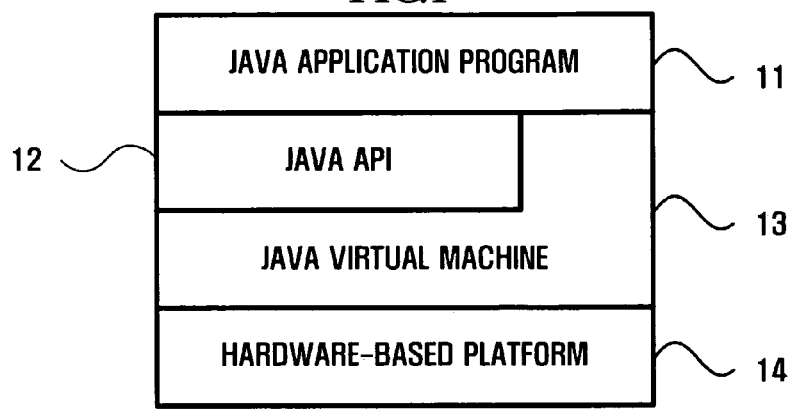
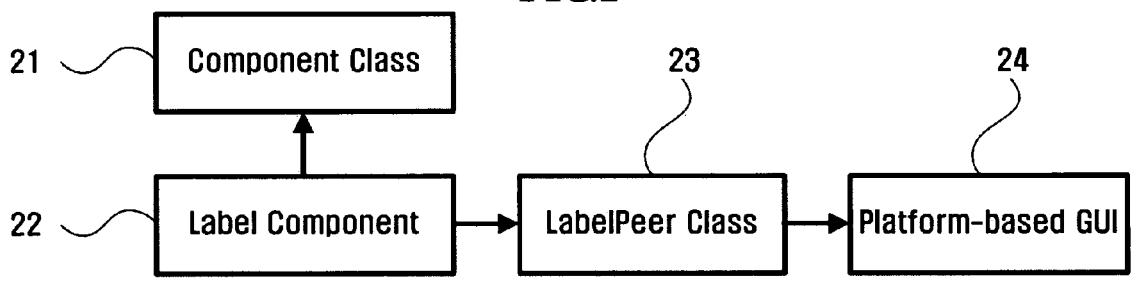
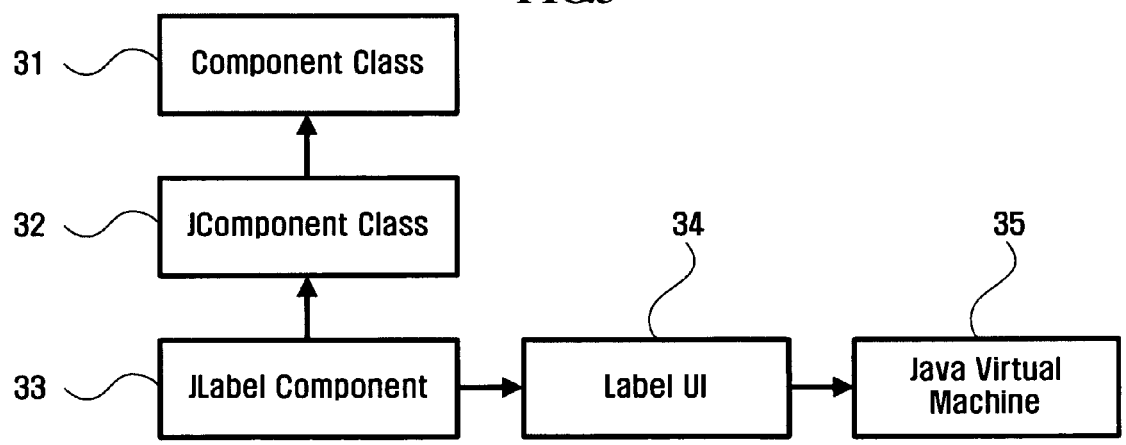

APPARATUS AND METHOD FOR CONVERTING THE VISUAL APPEARANCE OF A JAVA APPLICATION PROGRAM IN REAL TIME

CROSS-REFERENCE TO RELATED APPLICATION

This application claims priority of Korean Patent Application No. 10-2005-0006800 filed on Jan. 25, 2005 in the Korean Intellectual Property Office, the disclosure of which is incorporated herein in its entirety by reference.

BACKGROUND OF THE INVENTION

1. Field of the Invention

Apparatuses and methods consistent with the present invention relate to converting the visual appearance of a Java application program in real time, and more particularly, to a method and an apparatus for converting a visual appearance of the Java application program in real time that allows an interface-based Java application program to convert a color combination, font, icon, text position, and external appearance of a component in real time by adding a new interface that defines the visual appearance of the Java application program to a Java application programming interface (API).

2. Description of the Related Art

Java is an object oriented programming language that is platform independent. Here, the platform refers to hardware environment in which a program is executed or a software environment such as an operating system. Java code is compiled to Java byte code by a Java compiler, and the Java byte code is executed by a Java virtual machine (which has been ported to a variety of platforms).

FIG. 1 illustrates a conventional system in which a Java application program can operate.

The system comprises a Java application program 11, a Java application programming interface (API) 12, a Java virtual machine 13 and a hardware-based platform 14.

The Java application program 11 refers to a program written in the Java language, which is compiled into Java byte code using a Java compiler, and the Java byte code is interpreted by the Java virtual machine and then executed. At this time, the Java virtual machine 13 operates as an interpreter with respect to the Java byte codes.

The Java API 12 as aggregated libraries or classes for developing a Java program; they are provided in packaged units where interrelated classes are bundled.

The Java application program 11 uses the Java API 12 in order to provide a graphic user interface (hereinafter, referred to as a "GUI"), wherein the Java API 12 outputs a graphic on a screen by using a GUI of the platform 14.

The Java API 12 used for providing a GUI is classified into a heavy-weight API and a light-weight API, according to drawing modes. The heavy-weight API is platform-dependent because it writes a GUI in the format supplied by a platform-based GUI. The light-weight API can provide a GUI in the same format in other platforms as it writes the GUI in the format desired by the developer and transmits it to the platform-based GUI.

Here, the Java Abstract Window Toolkit is the heavy-weight API, and the Java Swing is the light-weight API.

FIG. 2 illustrates a construction of a class to draw a component through the conventional Java Abstract Window Toolkit.

The Label component 22 is an extension of a Component class 21 of the Abstract Window Toolkit, which is connected to a LabelPeer class 23 for connection with a platform-based GUI 24. The LabelPeer class 23 plays a role in connecting the platform-based GUI 24 and the Label component 22. Owing to this construction, the Abstract Window Toolkit provides a platform dependent GUI.

FIG. 3 illustrates a construction of a class to draw a component through the conventional Java Swing.

The Label component of Swing is JLabel, and a JLabel component 33 is an extension of the JComponent class 32. The JComponent class 32 finally inherits the Component class 31. The JLabel component 33 has an object 34 called a LabelUI, which draws the JLabel component 33, and which is not connected with a platform-based GUI. The portions that draw a component are all realized in Java, and they are output on a screen through the Java virtual machine 35.

Accordingly, Swing components are output on a screen having the same look, regardless of platforms.

The visual appearance is a visual property of a component output on a screen; it indicates a color combination, a font and an icon of a component, and the location and external appearance of text.

As mentioned above, the external appearance of the component changes according to the platform and real-time conversion is not impossible because the Abstract Window Toolkit is platform-dependent.

However, with Swing the external appearance of the component does not change according to a platform because Swing is platform-independent. However, applying Swing to a program written based on the Abstract Window Toolkit may produce problems.

The visual appearance of a component is only applicable in the application program unit due to a structural limitation of the light-weight API, and it can not be applied to all the application programs in operation on a platform.

SUMMARY OF THE INVENTION

An aspect of the present invention is to allow an interface-based Java application program to change looks in real time by adding a new interface with the defined looks of the Java application program to a Java API.

This aspect as well as other aspects, features and advantages of the present invention will become clear to those skilled in the art upon review of the following description.

According to an aspect of the present invention, there is provided an apparatus for converting a visual appearance of a Java application program in real time comprises a command reception unit which receives a command to convert the visual appearance of the Java application program currently in operation produced based upon the Abstract Window Toolkit, an interface management unit which refers to a stored visual appearance package according to the received command and converts the visual appearance by notifying a component of the Java application program of the visual appearance conversion and a display unit which outputs the Java application program to which the converted visual appearance is applied, on a screen.

A method for converting a visual appearance of a Java application program in real time comprises receiving a command to convert the visual appearance of the Java application program currently in operation produced based upon the Abstract Window Toolkit, referring to a stored visual appearance package according to the received command and converting the visual appearance by notifying a component of the Java application program of the visual appearance conversion and outputting the Java application program to which the converted visual appearance is applied on a screen.

BRIEF DESCRIPTION OF THE DRAWINGS

The above and other aspects, features and advantages of the present invention will become apparent from the following description of exemplary embodiments given in conjunction with the accompanying drawings, in which:

FIG. 1 illustrates a system in which the conventional Java application program can operate;

FIG. 2 illustrates a construction of a class to draw a component through the conventional Java Abstract Window Toolkit;

FIG. 3 illustrates a construction of a class to draw a component using the conventional Java Swing;

DETAILED DESCRIPTION OF THE INVENTION

Advantages and features of the present invention and methods of accomplishing the same may be understood more readily by reference to the following detailed description of exemplary embodiments and the accompanying drawings. The present invention may, however, be embodied in many different forms and should not be constructed as being limited to the embodiments set forth herein. Rather, these embodiments are provided so that this disclosure will be through and complete and will fully convey the concept of the invention to those skilled in the art, and the present invention will only be defined by the appended claims.

Exemplary embodiments of the subject application will be described in detail with reference to the accompanying drawings.

Figure 4:
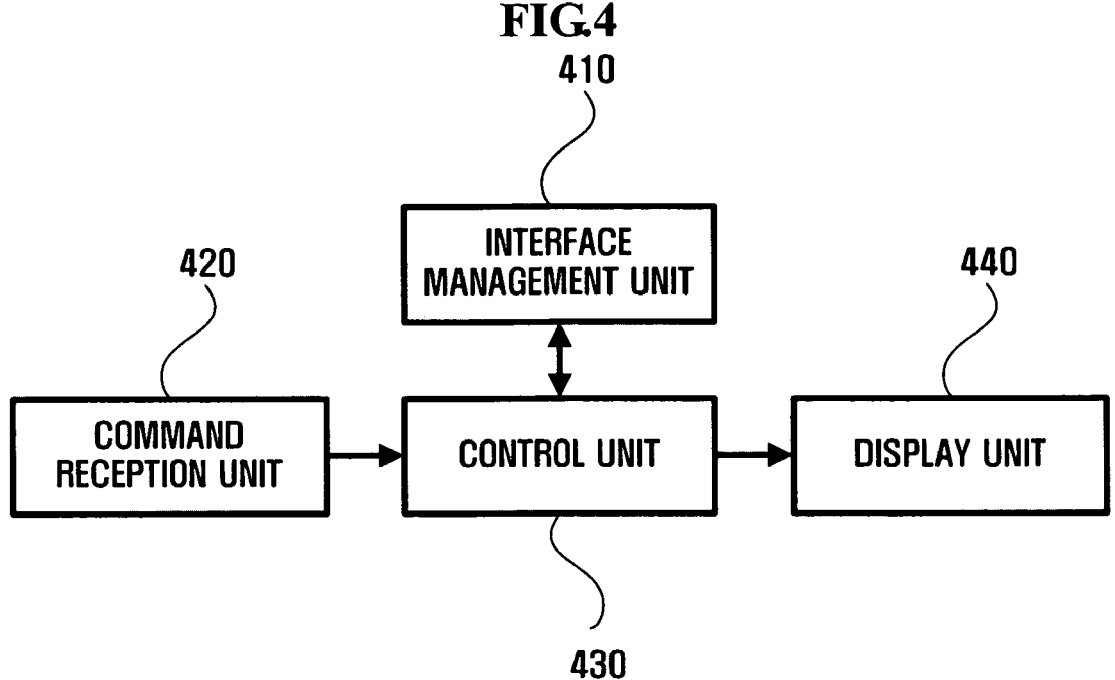
FIG. 4 is a block diagram illustrating an apparatus for converting the visual appearance of Java application program during run-time according to an exemplary embodiment of the present invention.

FIG. 4 is a block diagram illustrating an apparatus for converting the visual appearance of a Java application program in run time according to an exemplary embodiment of the present invention.

Although Swing provides more robust graphic functions than the Abstract Window Toolkit, such devices as electric home appliances, having limited memory, mainly have a graphic user interface written based on the Abstract Window Toolkit, since Swing libraries have to be stored in an apparatus.

An apparatus according to an exemplary embodiment of the present invention refers to one in which a graphic user's interface of a Java application program is written using the Abstract Window Toolkit. One of ordinary skill in the art would recognize, however, that the present invention is not limited to a Java application program written using the Abstract Window Toolkit.

An apparatus according to an embodiment of the present invention comprises an interface management unit 410, a command reception unit 420 and a display unit 440.

The command reception unit 420 receives a command to convert the visual appearance of an Abstract Window Toolkit-based Java application program currently in operation.

A visual appearance is a visual property of a Java application program such as a color combination, a font and an icon of a component, the location and an external appearance of text; for example, a window and a button.

A visual appearance conversion command input by a user is transmitted to the control unit 430, and the control unit 430 directs the interface management unit 410 to notify a component included in the Java application program of the visual appearance conversion by referring to the stored visual appearance package according to the received command, and then performs the visual appearance conversion.

The stored visual appearance package refers to a bundle of classes relating to a theme and a skin, which includes a skin package which details an external appearance of a component, and a theme package to form a theme by reading out property information relative to a color combination, a font and an icon of a component and the location of text.

A Java application program in operation applies the stored visual appearance package to its visual appearance and then converts the visual appearance using a newly stored visual appearance package.

The display unit 440 outputs the Java application program to which the converted visual appearance is applied, and the control unit 430 generally controls the command reception unit 420, the interface management unit 410 and the display unit 440.

Figure 5:
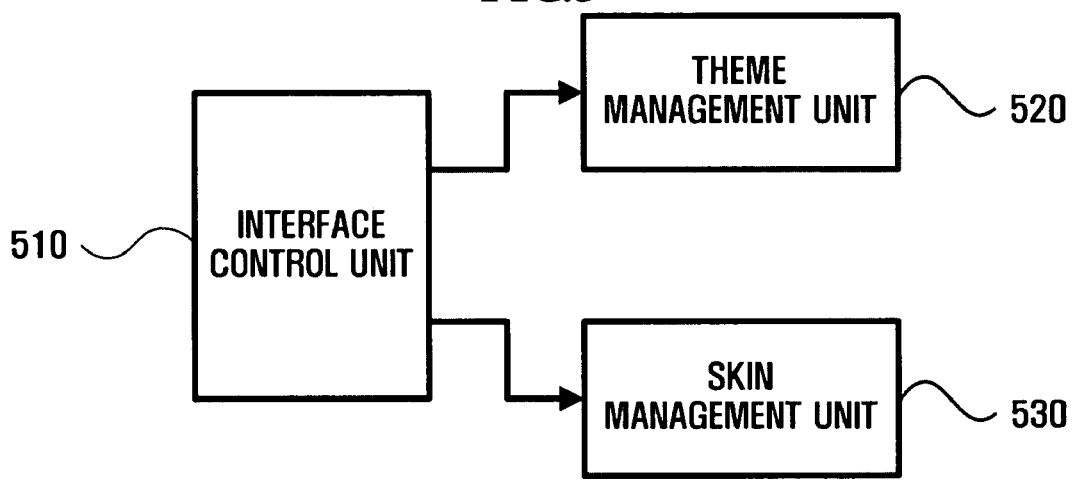
FIG. 5 is a block diagram illustrating an interface management unit according to an exemplary embodiment of the present invention.

FIG. 5 is a block diagram illustrating an interface management unit according to an exemplary embodiment of the present invention.

The interface management unit 410 comprises an interface control unit 510, a theme management unit 520 and a skin management unit 530.

The theme management unit 520 manages properties of a component according to properties such as a color combination, a font and an icon of a component and a location of text included in a Java application program, using property information of a theme read out from a file. More specifically, theme property information is loaded and stored when the apparatus is initialized, and this information is modified according to a command of the interface control unit 510 in real time and is then re-loaded.

The skin management unit 530 manages skin properties of a component according to properties of an external appearance of a component included in a Java application program by use of the stored skin package. More specifically, the content of a skin package is loaded and stored when the apparatus is initialized, and the content of a newly registered skin package is loaded in real time, according to a command from the interface control unit 510.

The skin management unit 530 confirms the presence of the skin requested by the interface control unit 510, and delivers the skin to the component if the requested skin exists; if not, the skin management unit 530 creates a new skin and delivers it to the component.

The interface control unit 510 manages the conversion status of the theme and the skin through general control of the theme management unit 520 and the skin management unit 530 according to a command from the control unit 430. When a change has occurred, the interface control unit 510 notifies each component of the Java application program of the change in the theme or the skin and allows them to convert their look.

Figure 6:
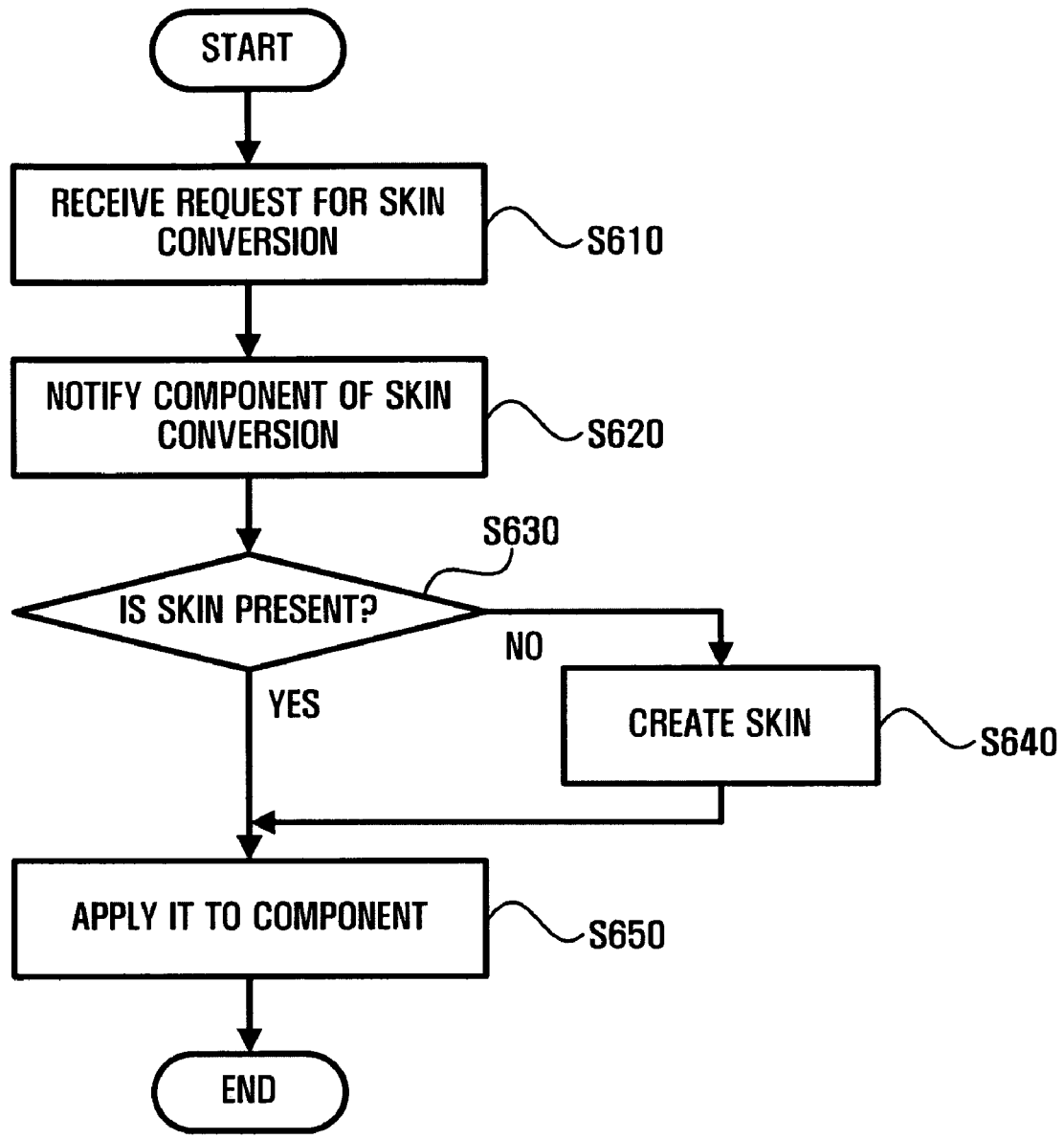
FIG. 6 is a flowchart illustrating a process during which skins of a component of a Java application program are converted according to an exemplary embodiment of the present invention.

FIG. 6 is a flowchart illustrating a process of converting a skin of a component of a Java application program according to an exemplary embodiment of the present invention.

When an apparatus is initialized, the theme management unit 520 and the skin management unit 530 load and store the property information of a theme and the content of a skin package. If the command reception unit 420 receives a command to convert the skin of the Java application program currently in operation from a user S610, the received skin conversion command is transmitted to the control unit 430, and the control unit 430 makes the interface management unit 410 convert the skin of the component.

The interface control unit 510 of the interface management unit 410 notifies a component of the skin conversion S620, and each component requests the new skin from the skin management unit 530. Accordingly, the skin management unit 530 checks if the skin exists S630. If the requested skin exists, the skin management unit 530 applies it to the component S650. If not, the skin management unit 530 creates a new skin S640 and applies it to the component S650.

The Java application program registers its top-level window in the interface control unit 510 when it is initialized. When a command to convert the skin is issued while the Java application program is in operation, the interface control unit 510 notifies each component of the application program of the skin conversion using the registered top-level window. Each component that has been notified of the skin conversion requests the converted skin from the skin management unit 530, and converts the skin using the transmitted skin.

Figure 7:
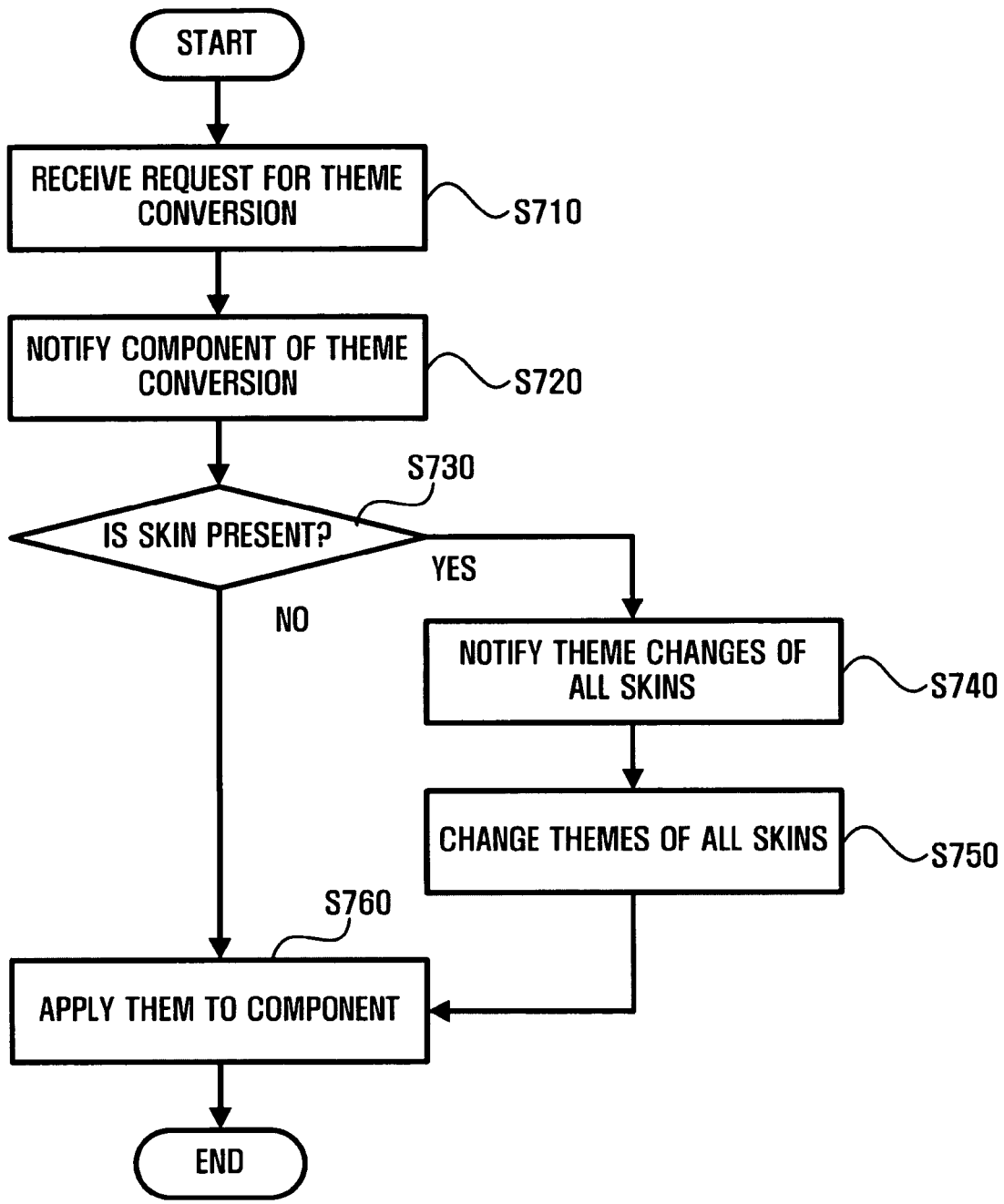
FIG. 7 is a flowchart illustrating a process during which themes of a component of a Java application program are converted according to an exemplary embodiment of the present invention

FIG. 7 is a flowchart illustrating a process of converting a theme of a component of a Java application program according to an exemplary embodiment of the present invention.

When an apparatus is initialized, the theme management unit 520 and the skin management unit 530 load and store the property information of a theme and the content of a skin package. When the command reception unit 420 receives a command to convert the theme of a Java application program in operation from a user S710, the received command is transmitted to the control unit 430 and the control unit 430 makes the interface management unit 410 convert the theme of a component.

The interface control unit 510 of the interface management unit 410 notifies a component of the theme conversion S720, and checks a skin using the theme property exists S730. If the skin exists, the interface control unit 510 notifies a theme conversion of the concerned skin S740. The skin management unit 530 converts a theme of a skin using the new theme according to the content of the theme stored in the theme management unit 520 S750. When the converted theme is applied to a component, the visual appearance of the component is converted S760.

The Java application program registers its top-level window in the interface control unit 510 when it is initialized. The interface management unit 510 notifies each component of the application program of a theme conversion by using the registered top-level window when a command to convert the theme is issued while the Java application program is in operation S720. Each component that has been notified of the theme conversion converts its theme using the theme transmitted from the theme management unit 520 S740.

An apparatus and a method for changing the visual appearance of a Java application in real time, according to the present invention, produce at least one of the following effects.

First, a new interface whereby the visual appearance of a Java application program is defined is added to the Java API, and the Java application program using this interface can convert the visual appearance in real time.

Second, since the new interface has a simplified construction, it can be added to an apparatus having limited resources.

Third, since the theme reads out information from an external property file the Java application program can change the theme property in real time without changing the code.

Fourth, the skin can be realized by a system dependent module, which improves the speed rate.

While the present invention has been illustrated and described with respect to exemplary embodiments thereof, it will be understood by those skilled in the art that the foregoing and other changes in form and details may be made therein without departing from the spirit and scope of the invention which should be limited only by the scope of the appended claims. Thus, exemplary embodiments of the invention disclosed above are used in a generic and descriptive sense only and not for purposes of limitation.

What is claimed is:

1. An apparatus for converting a visual appearance of a java application program in real time, comprising:
   a command reception unit which receives a command to convert the visual appearance of the java application program written using the Abstract Window Toolkit currently in operation;
   an interface management unit which refers to a visual appearance package defined and added in java API according to the received command and converts the visual appearance using the visual appearance package by notifying each component of the java application program of the visual appearance conversion; and
   a display unit which outputs the java application program to which the converted visual appearance is applied, on a screen in real time,
   wherein when the command to convert the visual appearance is issued, the component of the java application program is notified of the visual appearance conversion using a top-level window of the java application program, and
   the component converts the visual appearance using a visual appearance transmitted from the interface management unit,
   wherein the java application program is an interface-based java application program and the visual appearance of the java application program is converted by adding a new interface with a defined appearance of the java application program to the java API.

2. The apparatus of claim 1, wherein the visual appearance comprises properties of a color combination, a font and an icon of the component, and a location of text and external appearance of the component included in the java application program.

3. The apparatus of claim 1, wherein the visual appearance package comprises at least one of:
   theme property information with defined properties of the color combination, the font and the icon of the component, and the location of text of the component included in the java application program; and
   a skin package referring to properties of the external appearance of the component included in the java application program.

4. The apparatus of claim 1, wherein the interface management unit comprises:
   a theme management unit configured to manage at least one property of a color combination, a font and an icon of the component, and a location of text of the component included in the java application program;

a skin management unit configured to manage a property of the external appearance of the component included in the java application program; and an interface control unit configured to manage the visual appearance conversion of the component through a general control with respect to the skin management unit and the theme management unit.

5. The apparatus of claim 4, wherein the component is at least one of a control component and a container component inheriting a component class.

6. The apparatus of claim 4, wherein the interface control unit selectively applies the theme management unit or the skin management unit on the java application program currently in operation.

7. The apparatus of claim 4, wherein the interface control unit selectively applies the visual appearance conversion to at least one java application program, when a plurality of the java application programs are in operation.

8. The apparatus of claim 4, wherein the skin management unit creates a new skin and registers the new skin in memory, when the skin according to the received command is not registered in memory.

9. A method for converting a visual appearance of a java application program in real time, comprising:

receiving a command to convert the visual appearance of the java application program written using the Abstract Window Toolkit currently in operation;

referring to a visual appearance package defined and added in java API according to the received command and converting the visual appearance using the visual appearance package by notifying each component of the java application program of the visual appearance conversion; and outputting the java application program to which the converted visual appearance is applied on a screen in real time, wherein when the command to convert the visual appearance is issued, the component of the java application program is notified of the visual appearance conversion using a top-level window of the java application program, and the component converts the visual appearance using a transmitted visual appearance, wherein the java application program is an interface-based java application program and the visual appearance of the java application program is converted by adding a new interface with a defined appearance of the java application program to the java API.

10. The method of claim 9, wherein the visual appearance comprises properties of a color combination, a font and an icon of a component, and a location of text and external appearance of the component included in the java application program.

11. The method of claim 9, wherein the visual appearance package comprises at least one of:

theme property information with defined properties of a color combination, a font and an icon of the component, and a location of text of the component included in the java application program; and a skin package referring to properties of an external appearance of the component included in the java application program.

12. The method of claim 9, wherein converting the visual appearance comprises:

(a) managing at least one property of a color combination, a font and an icon of the component, and a location of text of the component included in the java application program;

(b) managing a property of an external appearance of the component included in the java application program; and (c) managing the visual appearance conversion of the component through a general control with respect to the step of (a) and the step of (b).

13. The method of claim 12, wherein the component is at least one of a control component and a container component inheriting a component class.

14. The method of claim 12, wherein the step of (c) comprises selectively applying the step of (a) or the step of (b) on the java application program currently in operation.

15. The method of claim 12, wherein the step of (c) comprises selectively applying the visual appearance conversion to at least one java application program, when a plurality of the java application programs are in operation.

16. The method of claim 12, wherein the step of (b) comprises creating a new skin and registering the new skin in memory, when a skin according to the received command is not registered in memory.

* * * * *